G. R. McFARLANE.
Car Wheel.
No. 7,903. Patented Jan. 14, 1851.
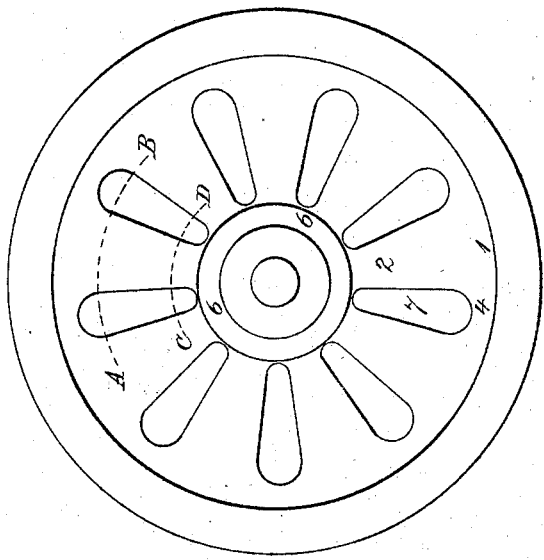
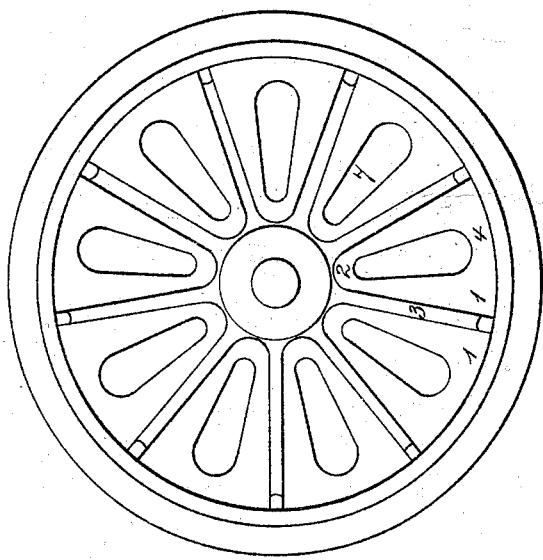
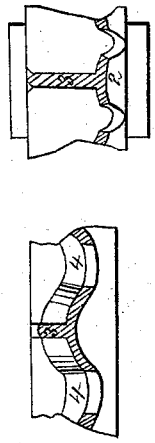
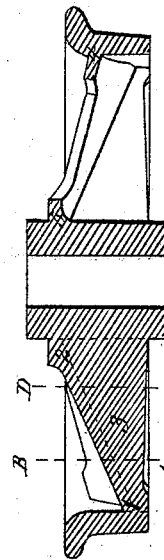
Witnesses:
Geo B Bowers
Wm Dunne
Inventor:
Geo R McFarlane

UNITED STATES PATENT OFFICE.

GEO. R. McFARLANE, OF HOLLIDAYSBURG, PENNSYLVANIA.

CAST-IRON CAR-WHEELS.

Specification of Letters Patent No. 7,903, dated January 14, 1851.

*To all whom it may concern:*

Be it known that I, GEORGE R. McFARLANE, of Hollidaysburg, in the county of Blair and State of Pennsylvania, have invented a new and Improved Method or Mode of Making Cast-Iron Car-Wheels for Railroads; and I do declare that the following is a full and exact description.

The tread or rim of the wheel is made in the usual form. The arms are composed in part of what may be described as portions of a hollow cone; in a horizontal position, the base connecting with the rim, as shown at 1 in the accompanying drawings; and the apex or point connecting with or rather terminating in the hub as shown at 2, and in part of angular ribs attached to the tenon or convex side of the horizontal cone and filling up the space between the rim and the hub as shown in the drawings at 3.

The arms thus formed are connected at the rim with slightly curved pieces or brackets as shown in the drawing at 4, forming a continuous bearing in every position the wheel may be placed in during a revolution, and by straight pieces at the hub as shown at 5 in the accompanying drawings, and forming a flange around the hub as shown at 6, materially adding to its strength. The remaining space between the arms forms oblong openings as shown at 7, allowing them (the arms) to yield to the contraction of the rim in cooling and permitting the hub to be split if considered advisable.

This wheel I call the combined spoke and plate wheel, and to enable others skilled in the art to make and use my invention I proceed to describe the mode of their construction.

In making a pattern for this wheel, the rim being made in such form and of such dimensions as may be required, the arms are made by forming one half or such smaller portions of a hollow cone, one half or three quarters of an inch in thickness, as may suit the number of arms intended to be used, and the depth of the rim; the base of the cone resting on the rim of the wheel as shown in the drawing at A B the concave side toward the flange or inner face of the wheel, and the apex or point connecting with or terminating in the hub as shown in the drawing of section at C, D.

An angular piece or rib (3) is then laid upon the lower or convex side of the cone running from the depth of the hub, less the thickness of the cone, to the rim. The space between the arms thus formed is fitted at the hub and rim, with a piece or bracket, slightly curved at the rim, and forming a continuous connection around the rim and hub, and having an oblong opening of about 9 inches long by 1¾ wide at the hub and 2¾ at the rim, rounded at either end as shown at 7, the dimensions varying with the diameter of the wheel and number of arms.

The advantages possessed by a wheel thus constructed, are. That while the curvilinear shape of the arms at their connection with the rim gives to the wheel all the strength and advantages possessed by a plate or disk wheel, the openings between the arms allowing the center of the wheel to give in cooling, the contraction is more easily regulated than in a plate wheel, and:

That the wheel may be cast with a solid or split hub as may be preferred; and may be molded either by bedding in or turning over.

After the solid hub wheel is cast I regulate the contraction by the application of water thrown upon the inner surface of the hub, in minute jets through a perforated tube or other apparatus adapted to the purpose and calculated to produce the effect.

What I claim as my invention and desire to secure by Letters Patent, is—

The mode of constructing a cast iron car wheel; by the use of spokes or arms composed in part of portions of a hollow cone, connected by brackets, and in part of straight spokes or arms, forming a combination of plates and spokes; possessing the advantage and obviating the objection of both.

GEO. R. McFARLANE.

Witnesses:
  GEO. B. BOWERS,
  WM. DUNN.